United States Patent [19]

Ueno et al.

[11] Patent Number: 5,593,776
[45] Date of Patent: Jan. 14, 1997

[54] FLUORORESIN COMPOSITES

[75] Inventors: Takuya Ueno; Masayuki Inamori, both of Osaka; Hirofumi Kyutoku, Ikoma, all of Japan

[73] Assignee: Osaka Gas Company, Limited, Osaka-fu, Japan

[21] Appl. No.: 194,283

[22] Filed: Feb. 8, 1994

[51] Int. Cl.[6] .................. B32B 27/04; B32B 27/20; B32B 27/28; D01F 9/12
[52] U.S. Cl. .................. 428/367; 428/401; 428/408; 428/421; 428/422; 428/902; 423/447.1; 423/447.2; 423/447.6; 423/447.7
[58] Field of Search .................. 423/447.1, 447.2, 423/447.6, 447.9, 447.4, 447.7, 447.8; 428/421, 422, 323, 367, 401, 902, 402, 408

[56] References Cited

U.S. PATENT DOCUMENTS

| | | | |
|---|---|---|---|
| 3,720,536 | 3/1973 | Scola et al. | 117/47 R |
| 4,026,863 | 5/1977 | Iseki et al. | 260/42.14 |
| 4,610,918 | 9/1986 | Effenberger et al. | 428/245 |
| 4,816,289 | 3/1989 | Komatsu et al. | 423/447.3 |
| 4,983,457 | 1/1991 | Hino et al. | 428/367 |
| 5,061,413 | 10/1991 | Uemura et al. | 264/29.2 |
| 5,300,366 | 4/1994 | Nakamaru et al. | 428/549 |

FOREIGN PATENT DOCUMENTS

| | | |
|---|---|---|
| 4-209656 | 7/1992 | Japan . |
| 5-32842 | 2/1993 | Japan . |
| 543763 | 2/1993 | Japan . |

*Primary Examiner*—D. S. Nakarani
*Assistant Examiner*—Vivian Chen
*Attorney, Agent, or Firm*—Cushman, Darby & Cushman IP Group of Pillsbury Madison & Sutro, LLP

[57] ABSTRACT

The fluororesin composite material with high mechanical strength characteristics and wear resistance comprising 99 to 40 parts by weight of a fluororesin, e.g. polytetrafluoroethylene, and 1 to 60 parts by weight of a carbon fiber wherein the carbon fiber has an interplanar spacing d(002) of 3.36 to 3.45 Å, a c-axis crystallite dimension (Lc) of 35 to 400 Å and an a-axis crystallite dimension (La) of 40 to 800 Å. The carbon fiber obtained by heat-treating a precursor fiber, previously infusiblized or flame resistance-treated, in an inert gas containing 20 to 5,000 ppm of an oxygen-containing gas at a temperature of 2,500° to 3,00° C.

5 Claims, No Drawings

FLUORORESIN COMPOSITES

FIELD OF THE INVENTION

The present invention relates to a fluororesin composite having high mechanical strength and sliding characteristics and particularly with excellent wear resistance.

BACKGROUND OF THE INVENTION

Polytetrafluoroethylene (hereinafter referred to briefly as PTFE) is not only resistant to heat and chemicals but is satisfactory in slidability, in particular, with a low coefficient of friction. However, PTFE is generally unsatisfactory in wear resistance and shows a large deformation (creep) under load, particularly at high temperature. Therefore, its utility is seriously restricted in high-temperature, high load applications.

To overcome these drawbacks, various fillers such as glass fiber, glass powder or beads, carbon fiber, graphite, molybdenum disulfide, metallic lubricants, metal oxides, etc. are commonly added to PTFE. Compared with the matrix resins, compositions supplemented with such additives have lower coefficients of friction and, hence, improved wear resistance. Therefore, these resin compositions find application in a broad range of industrial uses such as sliding members, parts and elements, e.g. bearings, gears, bushes, packings, various other sealing members, piston rings, ball valve seats, sliding bands and so on.

Meanwhile, sliding parts are required to have high mechanical strength and low wear characteristics including low counterpart wear characteristics for insuring high energy transmission efficiencies and meeting the maintenance-free requirement. The addition of fillers such as those mentioned above certainly leads to some improvements in the mechanical characteristics and wear resistance of moldings but even the shaped articles obtained by adding carbonaceous fillers, particularly carbon fibers which should promise high mechanical strength and low counterpart wear potentials, are not fully satisfactory in the above-mentioned respects.

SUMMARY OF THE INVENTION

It is an object of the present invention, therefore, to provide a fluororesin composite having improved mechanical and sliding characteristics and, particularly, excellent wear resistance.

It is another object of the present invention to provide a carbon fiber-reinforced fluororesin composite having high mechanical and sliding characteristics and, particularly, superior wear resistance even under high load.

A further object of the present invention is to provide a fluororesin composite useful for a sliding parts.

The inventors of the present invention did much research to improve the mechanical strength of fluororesin and found that the addition of a carbon fiber having herein-defined characteristics results in remarkable improvements in the mechanical and sliding characteristics and, in particular, wear resistance of fluororesin composites. This invention has been completed on the basis of the above finding.

The present invention provides a fluororesin composite comprising a fluororesin and a carbon fiber having an X-ray wide-angle diffraction pattern with an interplanar spacing d(002) in the range of 3.36 to 3.45 Angstrom units (Å), a c-axis crystallite dimension (Lc) in the range of 35 to 400 Å and an a-axis crystallite dimension (La) in the range of 40 to 800 Å.

The carbon fiber to be employed in the present invention may be prepared by, for example, subjecting a fiber capable of being converted to a carbon fiber (hereinafter referred to as a precursor fiber) or a carbon fiber to a heat treatment at a temperature not below 700° C. in an inert gas atmosphere containing 20 to 5,000 ppm of an oxygen-containing gas.

DETAILED DESCRIPTION OF THE PREFERRED EMBODIMENTS

The fluororesin which can be used in this invention includes various fluorine-contained polymers. The fluororesin includes, but is not limited to, homopolymers or copolymers of fluorine-containing monomers such as tetrafluoroethylene, chlorotrifluoroethylene, vinyl fluoride, vinylidene fluoride, hexafluoropropylene, perfiuoroalkyl vinyl ether, etc. and copolymers of said fluorine-containing monomers with other monomers copolymerizable therewith, such as ethylene, propylene, various acrylic esters and so on. As typical examples of fluororesin, there may be mentioned such homopolymers as polytetrafluoroethylene, polychlorotrifluoroethylene, polyvinylidene fluoride, etc. and such copolymers as tetrafluoroethylene-hexafluoropropylene copolymer, tetrafluoluoroethylene-perfluoroalkyl vinyl ether copolymer, tetrafluoroethylene-hexafluoropropylene-perfluoroalkyl vinyl ether copolymer, ethylene-tetrafluoroethylene copolymer, ethylene-chlorotrifluoroethylene copolymer and so on. These fluororesins can be used alone or in combination. Particularly preferred fluororesin includes polytetrafluoroethylene.

The fluororesin composite material of the present invention contains a carbon fiber having specific characteristics. Thus, the carbon fiber has an interplanar spacing between (002) planes, i.e. d(002) as measured by the X-ray wide-angle diffraction method, in the range of 3.36 to 3.45 Å and, as measured by the Gakusin method of the Japan Society for the Promotion of Science [cf. (1) "The method of determining the lattice constants and crystallite dimensions of man-made graphite", the Japan Society for the Promotion of Science Committee No. 117, (2) "Carbon Fibers (enlarged and revised edition)" authored by Sugio Ohtani, Kensuke Okuda and Shigeru Matsuda, pp. 733–740, Kindai Henshu], a c-axis crystallite dimension (Lc) of 35 to 400 Å and an a-axis crystallite dimension (La) of 40 to 800 Å. The preferred carbon fiber has a d(002) value of 3.36 to 3.43 Å, an Lc value of 35 to 300 Å and an La value of 40 to 600 Å. The more preferable carbon fiber has a d(002) value of 3.36 to 3.43 Å, an Lc value of 35 to 250 Å and an La value of 40 to 550 Å. When Lc and La exceed 400 Å and 800 Å, respectively, the coefficient of friction tends to decrease, but the coefficient of wear is increased to adversely affect the wear resistance under high load.

Preferably, the carbon fiber shows, in the Raman spectrometric analysis using an argon laser beam at 514.5 nm, a G value of 0.8 to 2.5 as given by the equation G=G2/G1, wherein G1 represents the integral value of spectral intensities in the wavelength region of 1360±100 cm$^{-1}$ and G2 represents the integral value of spectral intensities in the wavelength region of 1580±100 cm$^{-1}$. The G value defined above is more desirably about 0.85 to 2.5 and, for still better results, about 0.85 to 2.3. Each of the integral spectral intensity values mentioned above corresponds to the area intensity in the particular wavelength region of the spectral intensity curve. The G value is a parameter representing the proportion of the crystalline phase of the carbon fiber and if this value exceeds 2.5, the coefficient of friction tends to decrease, but the coefficient of wear is increased to lower the wear resistance under load.

Furthermore, the carbon fiber preferably has high thermal stability. The preferred carbon fiber shows a weight loss of not more than 1.75 weight %, preferably about 0.01 to 1.2 weight %, on heating in the air at 575° C. for 4 hours. When the weight loss of carbon fiber exceeds 1.75 weight %, the thermal stability is sacrificed and, probably because of insufficient growth of the graphitic structure, the wear resistance is not much improved.

There is practically no limitation on the fiber diameter and length of carbon fiber but short staples with a mean filament diameter of about 1 to 20 µm and a mean filament length of not less than 10 µm are generally employed. The preferred carbon fiber includes a short staple having a mean filament length of about 5 to 20 µm. The mean filament length is preferably in the range of about 50 µm to 5 mm, more preferably 50 µm to 3 mm and particularly 50 to 700 µm.

The relative amount of said fluororesin and carbon fiber can be selected according to the intended use of shaped articles, and, generally speaking, the composite material preferably comprises 99 to 40 parts by weight of the matrix fluororesin and 1 to 60 parts by weight of the carbon fiber. The more desirable composite material comprises about 95 to 65 parts by weight, particularly about 92 to 75 parts by weight of the matrix fluororesin and about 5 to 35 parts by weight, particularly about 8 to 25 parts by weight of the carbon fiber. The composite material having such a composition has high sliding, mechanical strength and moldability characteristics and is particularly excellent in wear resistance.

Within the range not adversely affecting its characteristics, the fluororesin composite material of this invention may contain a variety of additives such as fibrous reinforcing materials (for instance, short and long staples, e.g. other carbon fiber, glass fiber, aramid fiber, boron fiber, aluminum fiber, silicone carbide fiber, etc., whiskers, fibrous materials obtainable by cladding them with a metal such as nickel, aluminum, copper or the like), reinforcing fillers such as carbon blank, molybdenum disulfide, mica, talc, calcium carbonate, etc., metallic lubricants such as Sn, Pb, Cu, Zn and Li or their alloys, metal oxides such as the oxides of Sn, Zn, Al, Sb, Co, Si, Cu, Pb, etc., compound oxides of metals such as $Co-Al_2O_3$, coloring materials, stabilizers and so on.

In the invention, the conventional molding processes may be used for molding the composition comprising said fluororesin and said carbon fiber into a shaped article. A typical molding method that can be employed comprises mixing a powder of said fluororesin with a carbon fiber such as graphite fiber evenly using a mixer such as a Henschel mixer or the like, compression-molding the resulting mixture in a metal die or mold and heat-treating the molding at a temperature not below the melting point of the fluororesin (the last procedure is called annealing). An alternative method is melt extrusion or injection molding using the above mixture. In the former method involving prior shaping, it is important to insure that the fluororesin powder and graphite fiber be evenly admixed. The extrusion or injection molding can be conducted under a meltable temperature of the fluororesin in the mixture.

The carbon fiber to be used in the present invention should have the characteristics described hereinbefore but otherwise there is no particular limitation on the method for its production. For example, the carbon fiber can be obtained by heat-treating either a precursor fiber (carbonaceous fiber) or a carbon fiber at a temperature of not less than 700° C. in the presence of an inert gas containing 20 to 5,000 ppm of an oxygen-containing gas.

The precursor fiber, i.e. a fiber convertible to a carbon fiber, which is used in the production of the composite material according to this invention includes, but is not limited to, pitch fibers such as coal pitch, petroleum pitch, liquid crystal pitch and other pitch fibers and polymer fibers such as cellulose, polyacrylonitrile, rayon, phenolic resin and other fibers. At least one species of such fiber can be employed. The precursor fiber preferably has been subjected, at least, to infusiblization treatment or to flame resistance treatment. The term "infusiblization treatment" means the heating of a pitch fiber in the presence of oxygen at a temperature of, for example, about 200° to 450° C., to thereby form a heat-resistant surface layer which would present interfusion of fibers in the carbonization process. The term "flame resistance treatment" means a similar treatment of said precursor fiber other than pitch fibers.

The term "carbon fiber" means a carbonized or graphitized fiber. The term "carbonization" means a process of heat-treating or sintering a precursor fiber at a temperature of, for example, about 450° to 1,600° C. The term "graphitization" means a heat treatment or sintering at a temperature of about 1,600° to 3,300° C. and even in the absence of a graphitic crystal structure, the fiber treated or sintered at the above temperature is regarded as having been graphitized.

The oxygen-containing gas may be any oxygen-containing gas capable of oxidizing the precursor fiber or carbon fiber and includes oxygen, ozone, water vapor or steam, carbon monoxide, carbon dioxide, nitrogen dioxide and so on. Of these oxygen-containing gases, at least one species is employed. The preferred oxygen-containing gas includes oxygen. As the inert gas, there may be mentioned, for example, nitrogen, helium, neon, argon, krypton, etc. The inert gas may be a mixture of such gases.

The level of the oxygen-containing gas in the inert gas is about 20 to 5,000 ppm, preferably about 30 to 1,000 ppm and more preferably about 50 to 500 ppm. When the content of the oxygen-containing gas is below 20 ppm, the wettability of carbon fiber and the mechanical characteristics and wear resistance of moldings will not be much improved, and the content of the oxygen-containing gas exceeds 5,000 ppm, the fiber strength itself tends to be decreased so that no remarkable improvement can be realized in the mechanical characteristics or wear resistance of shaped articles.

The above fiber is gas-phase oxidized by the treatment or sintering in the above atmosphere. The proper temperature of the treatment varies with different kinds of fiber but is generally not below 700° C., preferably about 1,500° to 3,000° C. and more preferably about 2,200° to 3,000° C. When the above heat-treatment or sintering is carried out at a temperature of not less than 2,200° C., particularly not less than 2,500° C., the graphitic structure, which is more desirable, is obtained. When the temperature of this heat treatment is below 700° C., the wettability of carbon fiber and the mechanical characteristics and wear resistance of shaped articles will not be appreciably improved. The precursor fiber is either carbonized or graphitized to a carbon fiber in the same manner as above.

The specific surface area of the above heat-treated carbon fiber is not so critical insofar as the fiber has the above-mentioned characteristics but is generally about 0.6 to 10 $m^2/g$, preferably about 0.6 to 7 $m^2/g$ and more preferably about 0.6 to 5 $m^2/g$. The carbon fiber having such a specific surface area has an excellent wettability with respect to fluororesins and imparts high mechanical characteristics and wear resistance to the resins.

With the fluororesin composite material of this invention containing a carbon fiber having the defined crystalline structure, shaped articles having excellent mechanical and sliding characteristics and particularly high wear resistance can be manufactured.

The following examples are only illustrative of this invention and should by no means be construed as defining the scope of the invention.

EXAMPLES

Comparative Example

Ten (10) parts by weight of carbonized carbon fiber [SG-241, mean filament diameter: 13 μmø, mean filament length: 130 μm, manufactured by DONAC Co., Ltd.; Japan] and 90 parts by weight of PTFE [Teflon 7-J, Mitsui dupont Fluorochemical Co., Ltd.; Japan] were blended in a supermixer. The resultant powdery composition was compressed in a metal mold at a pressure of 450 kg/cm² to provide a shaped article measuring 50 mmø×62 mm.

EXAMPLES 1 TO 3

The same carbon fiber as used in Comparative Example was heat-treated in a nitrogen gas atmosphere containing 200 ppm of oxygen at 2,500° C. (Example 1), 2,700° C. (Example 2) or 3,000° C. (Example 3) for 2 hours. Then, using the resulting carbon fibers instead of the carbon fiber of Comparative Example, shaped articles were manufactured in the same manner as in Comparative Example.

The shaped articles obtained in Comparative Example and Examples 1 to 3 were respectively annealed in a nitrogen gas atmosphere by heating from room temperature to 380° C. at the rate of 120° C./hr, maintained at 380° C. for 5 hours and cooled to room temperature at the rate of 75° C./hr. Each article was then machined to provide a testpiece and the tensile strength of the testpiece was measured by the method according to Japanese Industrial Standards JIS K6891. The sliding characteristic of each shaped article was also determined in accordance with JIS K7218 (counterpart material: ISO, C45, load 15 kgf/cm², speed 0.5 m/sec., test time 8 hours). The characteristics of the carbon fibers and those of the respective shaped articles are presented in Table 1.

In Table 1, strength at break is expressed in units of kg/cm², elongation in units of %, yield strength in units of kg/cm² and specific gravity in units of g/cm³. The coefficient of dynamic friction is expressed in units of ×10⁻⁵ [(mm/km)/(kg/cm²)] and the wear of the counterpart in units of ×10⁻¹ (mg/km). The coefficient of dynamic friction shown in Table 1 is the mean value.

TABLE 1

|  | Example 1 | Example 2 | Example 3 | Com. Ex. |
|---|---|---|---|---|
| Specific surface area (m²/g) | 1.55 | 2.51 | 1.83 | 0.40 |
| d(002) (Å) | 3.37 | 3.37 | 3.43 | 3.48 |
| Lc (Å) | 110 | 90 | 46 | 24 |
| La (Å) | 145 | 120 | 59 | 14 |
| G value | 1.14 | 0.97 | 0.86 | 0.62 |
| Oxidation weight loss (% by weight) | 0.03 | 0.04 | 0.05 | 0.18 |

TABLE 1-continued

|  | Example 1 | Example 2 | Example 3 | Com. Ex. |
|---|---|---|---|---|
| Strength at break | 265 | 270 | 263 | 260 |
| Elongation | 288 | 285 | 286 | 320 |
| Yield strength | 199 | 210 | 204 | 115 |
| Specific gravity | 2.08 | 2.08 | 2.08 | 2.09 |
| Coefficient of dynamic friction | 0.17 | 0.17 | 0.20 | 0.22 |
| Coefficient of wear | 3.0 | 5.8 | 6.2 | 11.7 |
| Wear of the counterpart | <7 | <7 | <7 | 14 |

It is apparent from the Table that the shaped articles obtained in Examples invariably have high yield points so that permanent strains are hardly produced even under high load. Moreover, compared with the shaped article according to Comparative Example, the shaped articles obtained in Examples are superior in sliding characteristic and particularly in wear resistance.

What is claimed is:

1. A method of improving mechanical and sliding characteristics of a carbon fiber-reinforced fluororesin composite, which comprises molding into a shaped article a composition comprising a fluororesin and a carbon fiber having (1) an X-ray wide-angle diffraction pattern with
      (1a) an interplanar spacing d(002) value of 3.36 to 3.43 Å,
      (1b) a c-axis crystallite dimension (Lc) of 35 to 250 Å and
      (1c) an a-axis crystallite dimension (La) of 40 to 550 Å, (2) a G value of 0.85 to 2.3 as given by the equation G=G2/G1 wherein G1 is the integral value of spectral intensities in the wavelength region of $1,360 \pm 100$ cm⁻¹ and G2 is the integral value of spectral intensities in the wavelength region of $1,580 \pm 100$ cm⁻¹ as determined by Raman spectrometric analysis using an argon laser beam at 514.5 nm, (3) a mean filament diameter of 1 to 20 μm, (4) a specific surface area of 0.6 to 5 m²/g and (5) an oxidation weight loss of not greater than 1.75% by weight on heating in the air at 575° C. for 4 hours, (6) said carbon fiber being a carbon fiber obtained by heat treating a precursor fiber or carbon fiber at a temperature of 2,500 to 3,000° C. in the presence of an inert gas containing 30 to 1,000 ppm of an oxygen-containing gas.

2. A method for improving mechanical and sliding characteristics of a carbon fiber-reinforced fluororesin composite as claimed in claim 1, wherein said fluororesin is at least one member selected from the group consisting of polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-hexafluoropropylene-perfluoroalkyl vinyl ether copolymer, ethylene-tetrafluoroethylene copolymer and ethylene-chlorotrifluoro-ethylene copolymer.

3. A method for improving mechanical and sliding characteristics of a carbon fiber-reinforced fluororesin composite as claimed in claim 1, wherein said fluororesin is polytetrafluoroethylene.

4. A method for improving mechanical and sliding characteristics of a carbon fiber-reinforced fluororesin composite as claimed in claim 1, 2 or 3, in which said composition comprises 99 to 40% by weight of fluororesin and 1 to 60% by weight of said isotropic carbon fiber.

5. A method for improving the mechanical and sliding characteristics of a carbon fiber-reinforced fluororesin composite which comprises A. preparing a mixture comprising a fluororesin and a carbon fiber essentially evenly distributed therein, wherein said carbon fiber is obtained by heat treating a precursor fiber or carbon fiber at a temperature of 2,500° to 3,000° C. in the presence of an inert gas containing 30 to 1,000 ppm of an oxygen-containing gas, said treated carbon fiber having
- (1) an X-ray wide-angle diffraction pattern with
  - (1a) an interplanar spacing d(002) value of 3.36 to 3.43
  - (1b) a c-axis crystallite dimension (Lc) of 35 to 250 Å and
  - (1c) an a-axis crystallite dimension (La) of 40 to 550 Å,
- (2) a G value of 0.85 to 2.3 as given by the equation $G=G2/G1$ wherein G1 is the integral value of spectral intensities in the wavelength region of $1,360\pm100$ cm$^{-1}$ and G2 is the integral value of spectral intensities in the wavelength region of $1,580\pm100$ cm$^{-1}$ as determined by Raman spectrometric analysis using an argon laser beam at 514.5 nm,
- (3) a mean filament diameter of 1 to 20 μm,
- (4) a specific surface area of 0.6 to 5 m$^2$/g, and
- (5) an oxidation weight loss of not greater than 1.75% by weight on heating in the air at 575° C. for 4 hours; and B. molding said mixture to obtain said carbon fiber-reinforced fluororesin composite.

* * * * *